Figure 1:
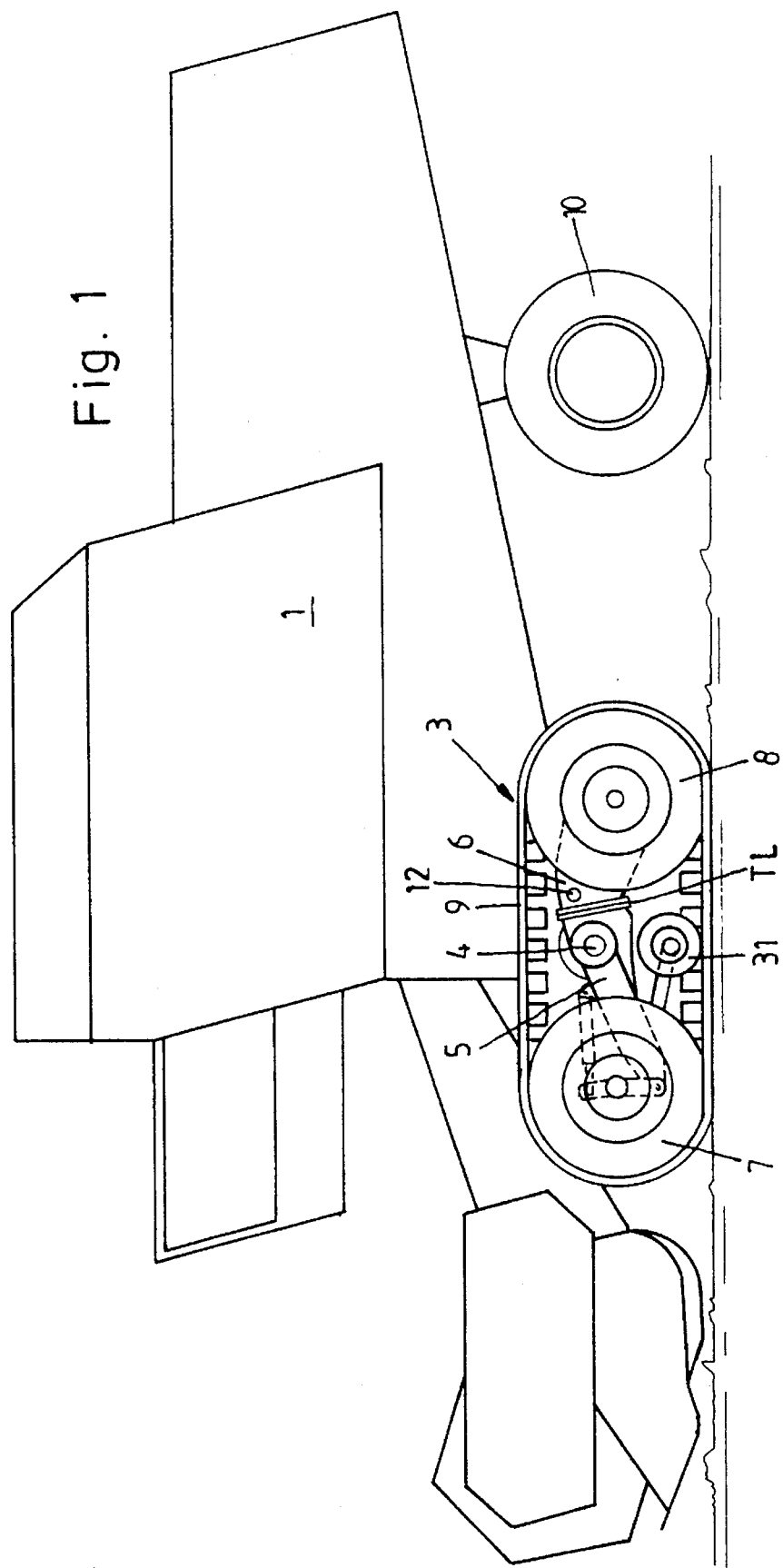

United States Patent

Gersmann

[11] Patent Number: 5,566,773
[45] Date of Patent: Oct. 22, 1996

[54] TRACKED UNDERCARRIAGE FOR HARVESTERS

[75] Inventor: Manfred Gersmann, Sassenberg, Germany

[73] Assignee: Claas oHG Beschrankt haftende offene Handelsgesellschaft, Harsewinkel, Germany

[21] Appl. No.: 433,917

[22] Filed: May 2, 1995

[30] Foreign Application Priority Data

May 4, 1994 [DE] Germany .......................... 44 15 689.8

[51] Int. Cl.⁶ ................................................. B62D 55/104
[52] U.S. Cl. ................................................. 180/9.5
[58] Field of Search ........................... 180/9.1, 9.5, 9.52, 180/9.54, 9.62, 9.64

[56] References Cited

U.S. PATENT DOCUMENTS

| | | | |
|---|---|---|---|
| 2,998,998 | 9/1961 | Hyler et al. | 180/9.1 X |
| 4,923,257 | 5/1990 | Purcell | 180/9.1 X |
| 5,368,115 | 11/1994 | Crabb | 180/9.1 |
| 5,409,305 | 4/1995 | Nagorcka | 180/9.52 X |

FOREIGN PATENT DOCUMENTS

| | | |
|---|---|---|
| 3738991 | 11/1987 | Germany . |
| 2434556 | 7/1994 | Germany . |
| 11923 | 10/1990 | WIPO . |
| 19975 | 10/1993 | WIPO . |

*Primary Examiner*—Kevin Hurley
*Attorney, Agent, or Firm*—Browdy and Neimark

[57] ABSTRACT

The tracked undercarriage for harvesters has a wheel-track drive unit (3) disposed on both sides of the machine, and each drive unit (3) has two rockers (5, 6), height-adjustably seated on a common, horizontal axle (4) extending transversely in respect to the direction of travel, two dual wheels (7, 8), rotatably seated on the free ends of the two rockers (5, 6) and an endlessly revolving track (9) guided around both dual wheels (7, 8), one tensioning element (28) for the track (9) acting on at least one dual wheel bearing (20) and a drive for at least one dual wheel (8). A separating line (TL) is drawn outside of the axle (4) in one rocker (6), wherein a releasable connection (16, 17, 18) with the other rocker (5) extended past the axle (4) is located in this separation line (TL), and this removable rocker (6) is embodied as a transmission housing (11) with a cardan shaft inlet (12) and toothed-wheel gear (13, 14, 15) for driving the dual wheel (8) seated on the removable rocker (6).

19 Claims, 4 Drawing Sheets

5,566,773

TRACKED UNDERCARRIAGE FOR HARVESTERS

The invention relates to a tracked undercarriage for harvesters, in particular combines, with a wheel-track drive unit disposed on both sides of the machine, which has two rockers, height-adjustably seated on a common, horizontal axle extending transversely in respect to the direction of travel, two dual wheels, rotatably seated on the free ends of the two rockers and an endlessly revolving track guided around both dual wheels, one tensioning element for the track acting on at least one dual wheel bearing and a drive for at least one dual wheel.

Such a tracked undercarriage has become known, for example, from WO 90/11923, U.S. Pat. No. 2,898,965 and DE-OS 41 93 720. In this connection, a change in length of the tracked undercarriage is partially disclosed, but nothing is said regarding the drive, and on the other hand the length of the tracked undercarriages is not adjustable and they are equipped with a comparatively elaborate drive.

It is the object of the invention to improve a tracked undercarriage taking up a portion of the length of a harvester in such a way that, along with a simple and cost-effective construction, an easy change of its length extending in the direction of travel is made possible and it is equipped with a simple drive which is independent of it.

The tracked undercarriage in accordance with the invention discloses a simple and cost-effective construction and its length extending in the direction of travel can be changed in an easy manner and, in the process, it is equipped with a simple drive installed independently of the change in length.

With this tracked undercarriage, a separation line is placed in a rocker, preferably the rocker to the rear in the direction of travel, by means of which the rear rocker, along with the dual wheel supported thereon, can be removed from the front rocker and in this way the change in length of the tracked undercarriage can be performed in that adapter elements are inserted between the two rockers, or that the front rocker accomplishes the same purpose by means of a structural extension. The two rockers are maintained connected in the separation line by a flanged connection, and this flanged connection is, on the one hand very stable in construction and, on the other hand, can be easily assembled and disassembled.

The drive for the rear dual wheel is housed in the rear rocker, independently of this separation which, in a preferred manner, is located outside of the jointed cross-shaft axle for both rockers, in that a cardan shaft inlet into the rear rocker is present at a distance from the jointed cross-shaft axle and the drive of the rear dual wheel is accomplished via spur pinions disposed in the rear rocker. In this case the rear rocker is embodied as the transmission housing for the drive.

The front rocker is formed by a box profile and connected on one end with the jointed cross-shaft axle and on the other side hingedly attached to the front dual wheel.

A tensioning element in the form of a pressure medium cylinder is attached on the one side between the front rocker and the axle bearing of the dual wheel, and a support wheel, acting on the endlessly revolving track, is located underneath the jointed cross-shaft axle and is coupled, movable in height, with the front rocker via an oscillating lever and is affected by a pressure element, preferably a pressure medium spring.

The force transfer to a transverse axle of the harvester outside of the jointed cross-shaft axle into the rear rocker and therefore also outside of the seating of the tracked undercarriage permits a simple design of the oscillation point, i.e. of the jointed cross-shaft axle and the bearing bush seated thereon for the two rockers, and furthermore makes possible the variation options in regard to a change in length.

Figure 2:
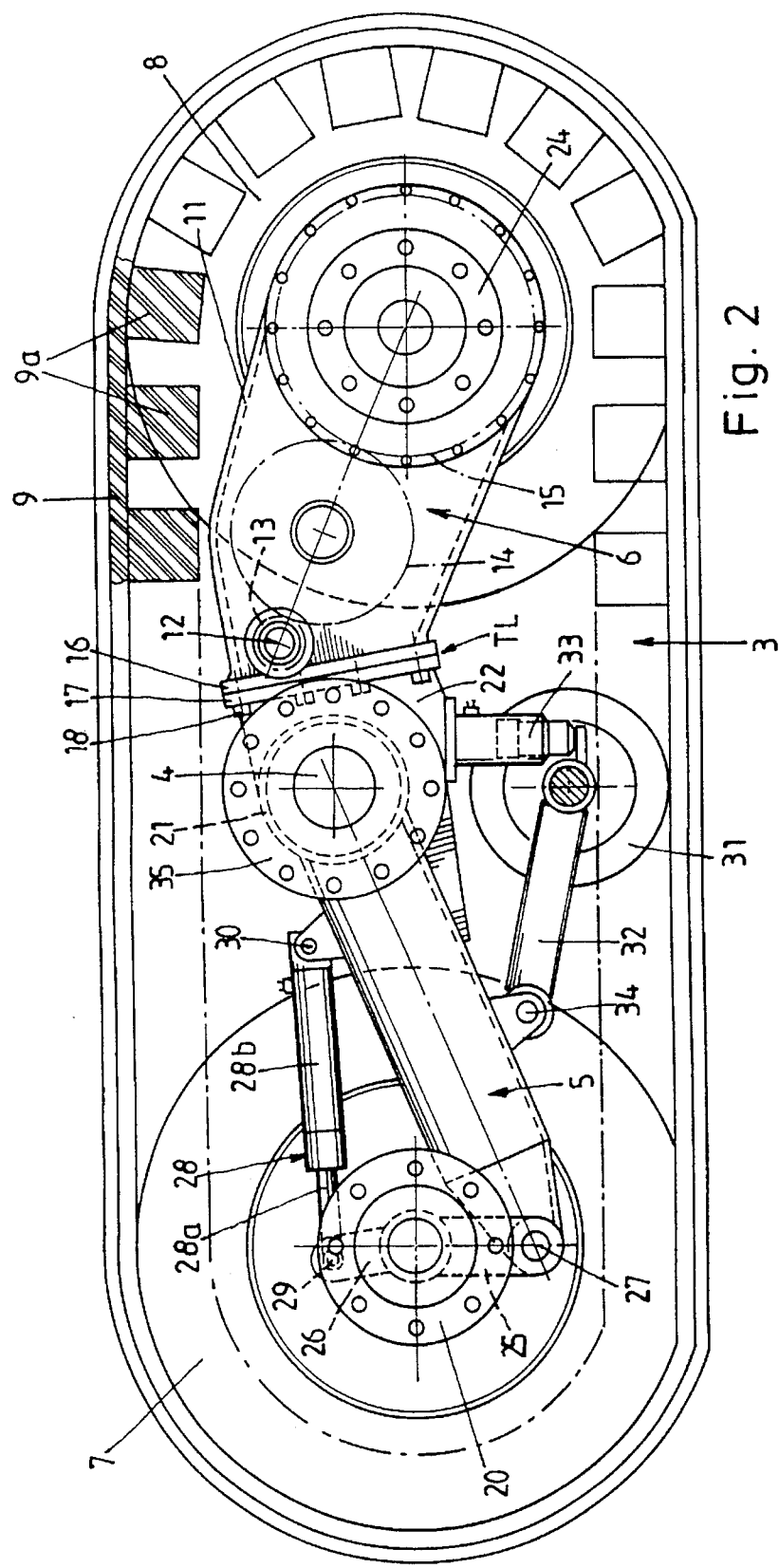
Figure 3:
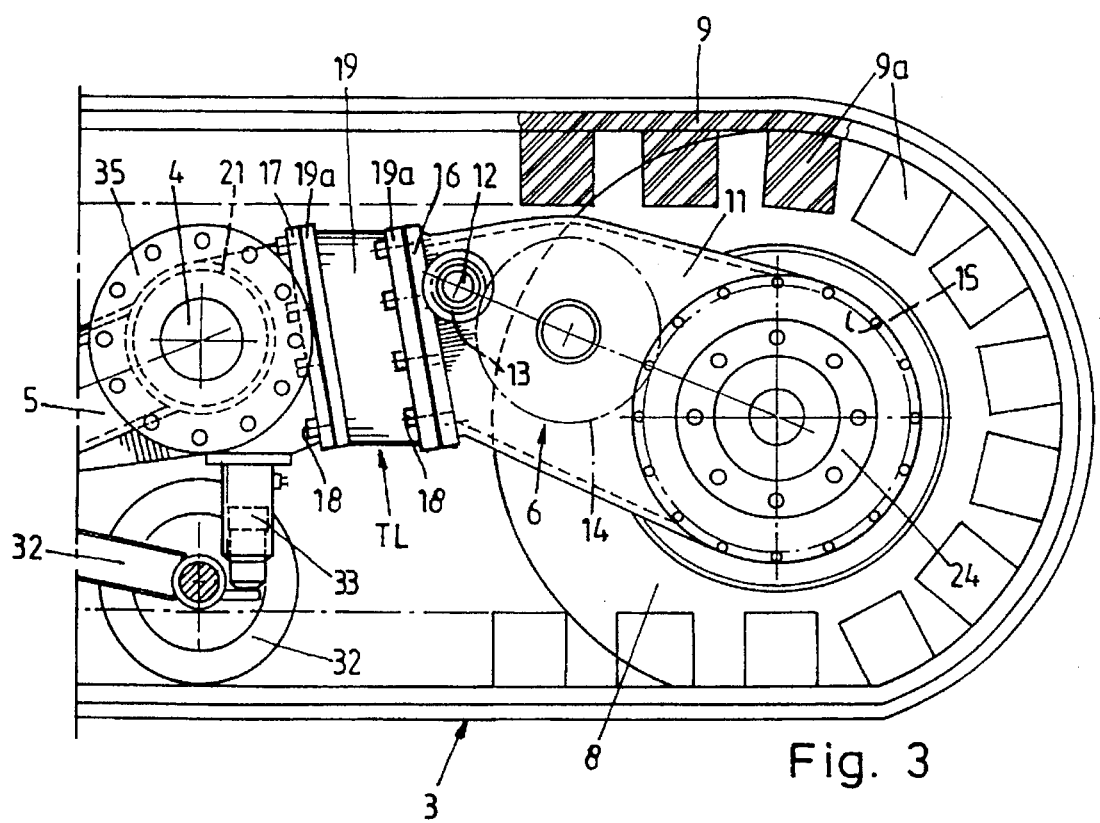
Figure 4:
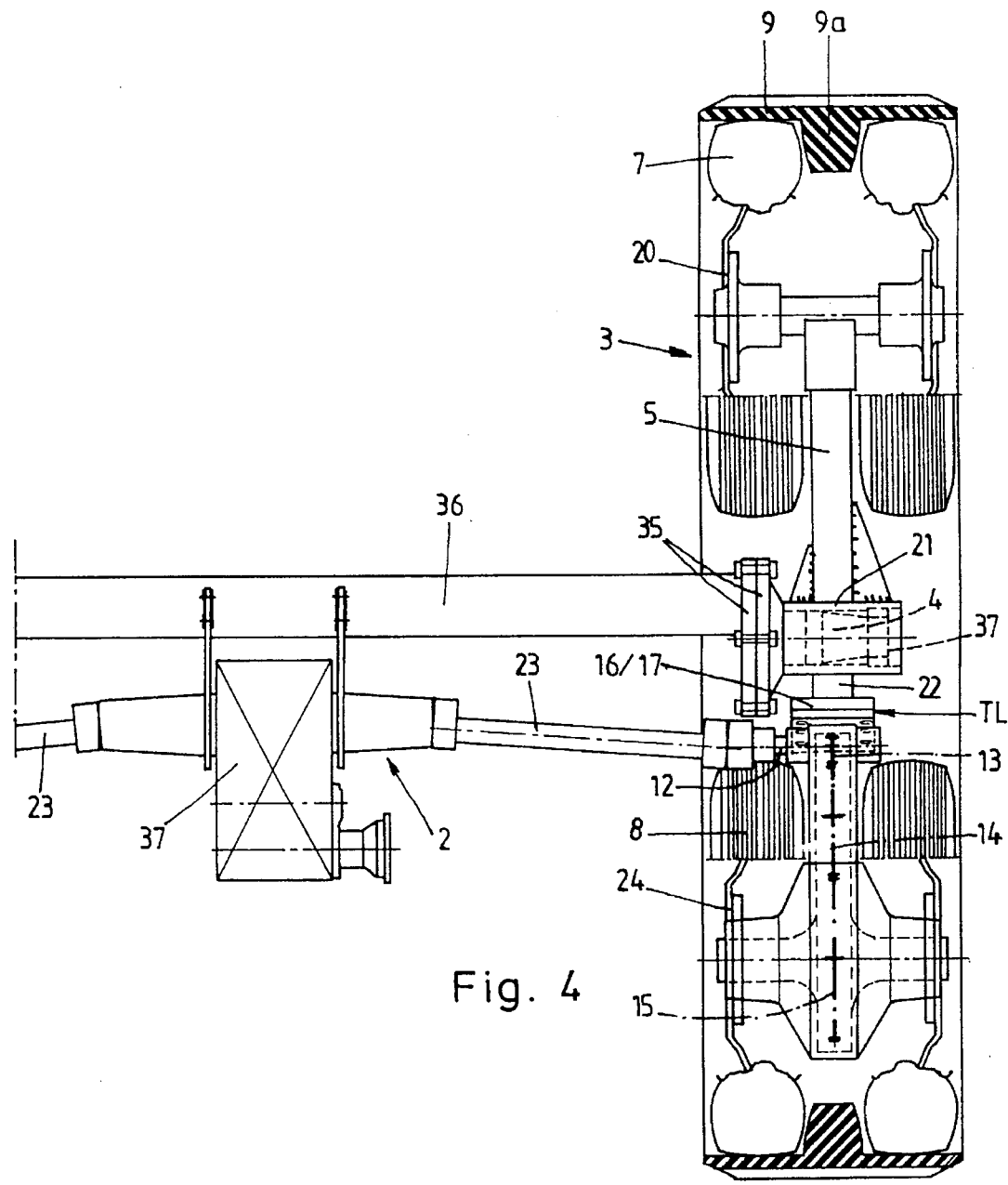

An exemplary embodiment of the invention is represented in the drawings and will be explained in detail below. Shown are in:

FIG. 1, a schematic lateral view of a combine with a tracked undercarriage taking up a portion of the length of the combine, FIG. 2, a lateral view of the tracked undercarriage with dual wheels seated on rockers oscillatingly suspended on a horizontal axle and with an endlessly revolving track, wherein the rear rocker is embodied as a removable transmission housing with the drive for the rear dual wheel, FIG. 3, a lateral view of the rear part of the tracked undercarriage with an adapter element inserted into the separation area of the rear rocker for change in length of the tracked undercarriage, FIG. 4, a top view of the drive unit of the tracked undercarriage with a cardan shaft drive.

The tracked undercarriage of harvesters, in particular combines, has two wheel-track drive units (3) operated by a common drive (2) and disposed in both sides of the harvester (1). These two wheel-track drive units (3) are of the same length extending in the direction (A) of travel, and the tracked undercarriage comprised by them takes up a portion of the length of the harvester (1), so that it practically forms a short track which, together with an additional pair of wheels (10) results in the entire undercarriage.

Each track-wheel drive unit (3) has two rockers (5, 6) seated height-adjustably on a common axle (4) extending transversely to the direction (A) of travel, on whose free ends respectively one dual wheel (8) is rotatably seated; an endless revolving track (9) is guided around both dual wheels (7, 8).

A separating line (TL) is drawn outside of the axle (4) in one rocker (6) and a releasable connection with the other rocker (5) extended past the axle (4) is located in this separation line (TL). The removable rocker (6) is embodied as a transmission housing (11) with a cardan shaft inlet (12) and toothed-wheel gear (13 to 15) for driving the dual wheel (8) seated on the removable rocker (6).

The separation line (TL) lies in the rocker (6) which is located to the rear in the direction (A) of travel, and only the rear dual wheel (8) is powered.

A flanged connection (16, 17) between the two rockers (5, 6) is provided in the separation line (TL), wherein a flange (16, 17) is fastened on each rocker (5, 6) and both flanges (16, 17) are releasably connected by bolts (18).

For changing the length of the wheel-track drive unit (3)—the axial distance of the two dual wheels (7, 8)—, an adapter element (19) in the form of a box element with flanges (19a) can be inserted along the separation line (TL) between the flanged connection (16, 17, 18) and connected with the flanges (16, 17) by means of bolts (18) (FIG. 3).

The rocker (5) at the front in the direction (A) of travel is embodied as an elongated box profile and one of its long ends is in hinged connection with the axle bearing (20) of the front dual wheel (7). In the area of the other long end, this rocker (7) has a bearing bush (21) for receiving the horizontal axle (4) extending transversely to the direction (A) of travel and linear direction of the rocker, and a flange connecting element (22) for connection with the rear rocker (6) attached to this bearing bush (21) and constituting the extension of the rocker beyond the axle (4).

At a short distance from the separation line (TL), the cardan shaft inlet (12) is located in the rocker (6), which has the form of a transmission housing, and the toothed gear drive is formed by a drive pinion gear (13) seated on the cardan shaft (23), an intermediate gear wheel (14) meshing with it and a gear wheel (15), fixed on the axle bearing (24)

of the dual wheel (8) and driven by the intermediate gear wheel (14).

At its axle bearing (20), the front dual wheel (7) has a double-armed seating and tensioning lever (25, 26), whose downward-oriented seating arm (25) is hingedly engaged by the free end of the front rocker (5) on a horizontal shaft (27). A tensioning element (26) formed by a pressure medium cylinder acts with its piston rod (28a) on the upward-oriented seating arm (26) in a shaft (29), and this tensioning element (28) is hingedly seated with its cylinder housing (28b) on a shaft (30) at the rocker (5).

A support wheel (31) acting on the track (9) is disposed between the two dual wheels (7, 8) and is connected, movable in height, via a hinged lever (32) on a horizontal shaft (34) with the front rocker (5) and is affected by the pressure of a pressure medium spring (33) fixed in place on the rocker (5)—for example its connecting part (22)—.

With its bearing bush (21) the front rocker (5) is fastened via a flanged connection (35) on a transverse machine support (36), and the bearing bush (21) is fixed in place in the axial direction on the axle (4) by means of a bolt connected (37) at the front end.

Both track-wheel drive units (3) are powered through their rear dual wheel (8) by a drive transmission (37) fastened on the transverse machine support (36), to which the drive (2) is connected, via a respective cardan shaft (23) extending therefrom.

In a preferred manner the dual wheels (7, 8) are formed by pneumatic tires and the track (9) is constituted by a plastic or rubber belt, which is engaged, revolvingly guided and secured against lateral excursion, by means of guide strips (9a) between the dual wheels.

I claim:

1. A tracked undercarriage for harvesters with a wheel-track drive unit disposed on both sides of the machine, which has two rockers including a first removable rocker (6) and a second rocker, the rockers being height-adjustably seated on a common, horizontal axle (4) extending transversely in respect to a direction of travel, two dual wheels, rotatably seated on free ends of the two rockers, an endlessly revolving track guided around both dual wheels, one tensioning element for the track acting on at least one dual wheel bearing, and a drive for at least one dual wheel, wherein a separating line (TL) is drawn outside of the axle (4) in the removable rocker (6), a releasable connection (16, 17, 18) with the second rocker (5) extended past the axle (4) is located in this separation line (TL).

2. The tracked undercarriage in accordance with claim 1, wherein the separation line (TL) lies in the removable rocker (6) which is located to the rear in the direction (A) of travel, and a rear one of the dual wheels (8) is powered.

3. The tracked undercarriage in accordance with claim 2, wherein a flanged connection (16, 17), held together by bolts, is provided in the separation line (TL) between the two rockers (5, 6).

4. The tracked undercarriage in accordance with claim 3, comprising an adapter element (19) in the form of a box element with flanges (19a) which can be inserted along the separation line (TL) between the flanged connection (16, 17) and fixed in place by means of bolts (18) for changing the length of the wheel-track drive unit (3).

5. The tracked undercarriage in accordance with claim 4, wherein the second rocker (5) at the front in the direction (A) of travel comprises an elongated box profile, and wherein the second rocker, is in hinged connection at a first end thereof with an axle bearing (20) of a front dual wheel (7), includes a bearing bush (21) at a second end thereof for receiving the horizontal axle (4) extending transversely to the direction (A) of travel and generally to a linear direction of the second rocker, and includes a flange connecting element (22) for connection with the removable rocker (6) attached to the bearing bush (21) and constituting an extension of the second rocker beyond the axle (4).

6. The tracked undercarriage in accordance with claim 5, wherein the removable rocker (6) comprises a transmission housing, and at a short distance from the separation line (TL), the cardan shaft inlet (12) is located in the removable rocker (6), and wherein the removable rocker comprises a toothed gear drive including a drive pinion gear (13) seated on a cardan shaft (23), an intermediate gear wheel (14) meshing with the drive pinion gear and a gear wheel (15), the gear wheel (15) being fixed on an axle bearing (24) of the rear dual wheel (8) and driven by the intermediate gear wheel (14).

7. The tracked undercarriage in accordance with claim 6, wherein at the axle bearing (20), the front dual wheel (7) includes a double-armed seating and tensioning lever (25, 26), the lever including a downward-oriented seating arm (25) hingedly engaged by a free end of the second rocker (5) on a horizontal shaft (27), the lever including an upward-oriented seating arm (26) including a tensioning element (28), comprising a pressure medium cylinder, the tensioning element being hingedly seated with a piston rod (28a) thereof on a second shaft (29), and with a cylinder housing thereof (28b) on a third shaft (30) at the second rocker (5).

8. The tracked undercarriage in accordance with claim 7, wherein a support wheel (31) acting on the track (9) is disposed between the two dual wheels (7, 8) under the horizontal axle (4) and is connected and movable in height, via a hinged lever (32) with the second rocker (5) and is affected by the pressure of a pressure medium spring (33) fixed in place on the second rocker (5).

9. The tracked undercarriage in accordance with claim 8 wherein with the bearing bush (21) the front rocker (5) is fastened via a flanged connection (35) on a transverse machine support (36), and the bearing bush (21) is fixed in place on the axle (4) by means of a bolt connection (37) at the front end.

10. The tracked undercarriage in accordance with claim 9 wherein the rear dual wheels (8) of both track-wheel drive units (3) are powered by a drive transmission (37), fastened on the transverse machine support (36), of the drive (2) engaging it via a respective cardan shaft (23) extending therefrom.

11. The tracked undercarriage in accordance with claim 1, wherein a flanged connection (16, 17), held together by bolts, is provided in the separate line (TL) between the two rockers (5, 6).

12. The tracked undercarriage in accordance with claim 1, comprising an adapter element (19) in the form of a box element with flanges (19a) which can be inserted along the separation line (TL) between the flanged connection (16, 17) and fixed in place by means of bolts (18) for changing the length of the wheel-track drive unit (3).

13. The tracked undercarriage in accordance with claim 1, wherein the second rocker (5) at the front in the direction (A) of travel comprises an elongated box profile, and wherein the second rocker, is in hinged connection at a first end thereof with an axle bearing (20) of a front dual wheel (7), includes a bearing bush (21) at a second end thereof for receiving the horizontal axle (4) extending transversely to the direction (A) of travel and generally to a linear direction of the second rocker, and includes a flange connecting element (22) for connection with the removable rocker (6) attached to the bearing bush (21) and constituting an extension of the second rocker beyond the axle (4).

14. The tracked undercarriage in accordance with claim 1, wherein the removable rocker (6) comprises a transmission housing, and at a short distance from the separation line (TL), the cardan shaft inlet (12) is located in the removable rocker (6), and wherein the removable rocker comprises a toothed gear drive including a drive pinion gear (13) seated on a cardan shaft (23), an intermediate gear wheel (14) meshing with the drive pinion gear and a gear wheel (15), the gear wheel (15) being fixed on an axle bearing (24) of the rear dual wheel (8) and driven by the intermediate gear wheel (14).

15. The tracked undercarriage in accordance with claim 1, wherein at the axle bearing (20), the front dual wheel (7) includes a double-armed seating and tensioning lever (25, 26), the lever including a downward-oriented seating arm (25) hingedly engaged by a free end of the second rocker (5) on a horizontal shaft (27), the lever including an upward-oriented seating arm (26) including a tensioning element (28), comprising a pressure medium cylinder, the tensioning element being hingedly seated with a piston rod (28a) thereof on a second shaft (29), and with a cylinder housing thereof (28b) on a third shaft (30) at the second rocker (5).

16. The tracked undercarriage in accordance with claim 1, wherein a support wheel (31) acting on the track (9) is disposed between the two dual wheels (7, 8) under the horizontal axle (4) and is connected and movable in height, via a hinged lever (32) with the second rocker (5) and is affected by the pressure of a pressure medium spring (33) fixed in place on the second rocker (5).

17. The tracked undercarriage in accordance with claim 1, wherein with the bearing bush (21) the front rocker (5) is fastened via a flanged connection (35) on a transverse machine support (36), and the bearing bush (21) is fixed in place on the axle (4) by means of a bolt connection (37) at the front end.

18. The tracked undercarriage in accordance with claim 1, wherein the rear dual wheels (8) of both track-wheel drive units (3) are powered by a drive transmission (37), fastened on the transverse machine support (36), of the drive (2) engaging it via a respective cardan shaft (23) extending therefrom.

19. The tracked undercarriage in accordance with claim 1, wherein the removable rocker (6) comprises a transmission housing (11) with a cardan shaft inlet (12) and toothed-wheel gear (13, 14, 15) for driving the dual wheel (8) seated on the removable rocker (6).

* * * * *